United States Patent [19]

Bentivegna

[11] Patent Number: 5,553,905
[45] Date of Patent: Sep. 10, 1996

[54] ORNAMENT HANDLING APPARATUS

[76] Inventor: Peter I. Bentivegna, 541 S. Schuylkill, Jeffersonville, Pa. 19403

[21] Appl. No.: 401,361

[22] Filed: Mar. 9, 1995

[51] Int. Cl.$^6$ ...................................................... B25J 1/04
[52] U.S. Cl. ........................................ 294/24; 294/19.1
[58] Field of Search ........................... 294/2, 15, 19.1, 294/22–24, 26, 27.1; 29/270; 81/487, 488; 248/317, 339, 340, 343, 544

[56] References Cited

U.S. PATENT DOCUMENTS

| | | | |
|---|---|---|---|
| D. 268,561 | 4/1983 | Risser . | |
| 589,945 | 9/1897 | Groat | 294/24 |
| 705,775 | 7/1902 | Moore . | |
| 734,180 | 7/1903 | Kanaly . | |
| 828,012 | 8/1906 | Armstrong | 294/24 |
| 883,805 | 4/1908 | Huttinger | 294/24 |
| 909,729 | 1/1909 | Wollam | 294/24 |
| 1,217,680 | 2/1917 | Bagby . | |
| 1,512,315 | 10/1924 | Sandford . | |
| 1,540,810 | 6/1925 | Simon . | |
| 1,686,889 | 10/1928 | Woods . | |
| 2,161,512 | 6/1939 | Haislip . | |
| 3,242,540 | 3/1966 | Mitchell . | |
| 3,561,718 | 2/1971 | Iverson | 294/19.1 X |
| 3,644,951 | 2/1972 | Colburn . | |
| 3,819,221 | 6/1974 | O'Connor | 294/19.1 X |
| 3,868,136 | 2/1975 | Schweitzer, Jr. | 294/19.1 X |
| 3,877,325 | 4/1975 | Wall . | |
| 3,936,088 | 2/1976 | Williams | 294/19.1 |
| 4,034,595 | 7/1977 | Smith | 72/458 |
| 4,153,286 | 5/1979 | Piper et al. | 294/19.1 |
| 4,163,576 | 8/1979 | Hoop | 294/19.1 |
| 4,249,763 | 2/1981 | Provencher et al. | 294/19.1 |
| 4,395,840 | 8/1983 | Banks, Jr. | 43/17.2 |
| 4,683,783 | 8/1987 | Fanberg | 81/15.9 |
| 4,899,050 | 2/1990 | Cianflone | 200/331 |
| 5,052,733 | 10/1991 | Cheung et al. | 294/19.1 |
| 5,224,745 | 7/1993 | Howell | 294/19.1 |

Primary Examiner—Johnny D. Cherry
Attorney, Agent, or Firm—Webb Ziesenheim Bruening Logsdon Orkin & Hanson, P.C.

[57] ABSTRACT

An apparatus for handling ornaments and other objects is disclosed, including an elongated handle and a hook-shaped applicator. The applicator is attached to one end of the elongated handle and a hook receiving hole extends at least partially into the applicator to hold an ornament hook therein. The apparatus may further include a retriever for removing ornaments. The apparatus may alternatively include an applicator affixed to a connector for attachment to an elongated handle, or additionally, the apparatus may be sold as a kit where the applicator and retriever are removably affixed to the elongated handle or are attached to separate connectors for attachment to the elongated handle.

20 Claims, 8 Drawing Sheets

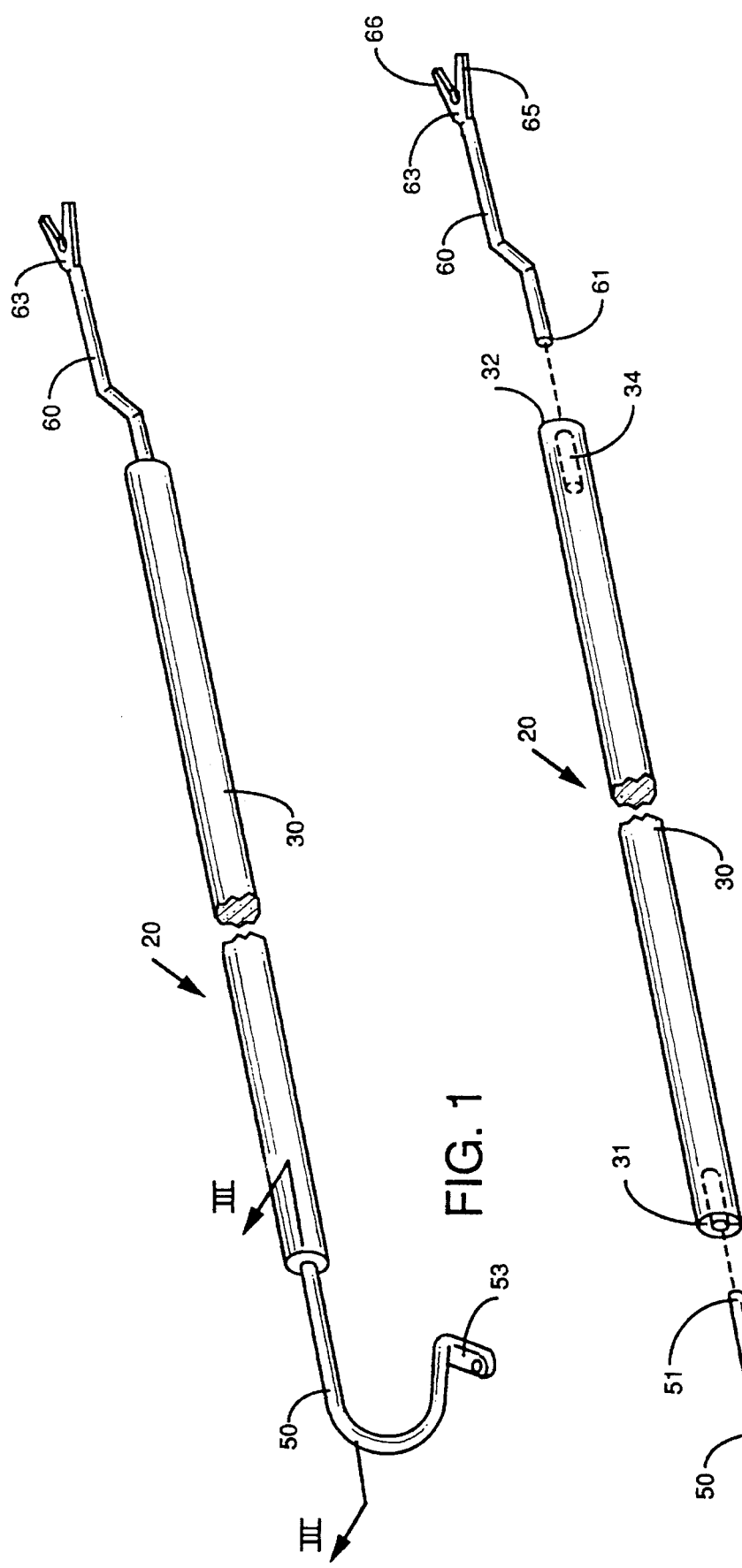

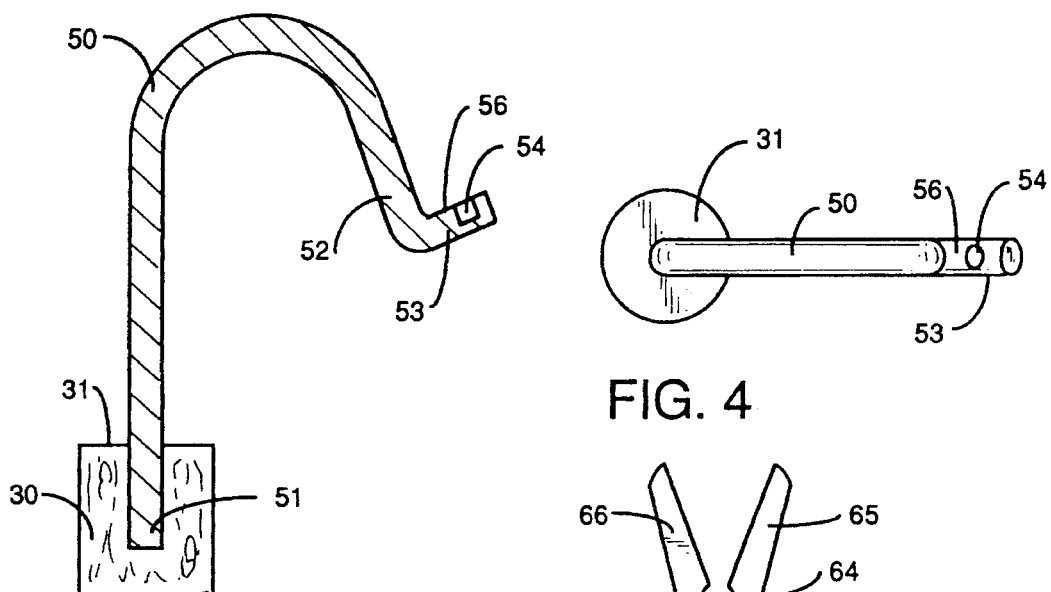
FIG. 3
FIG. 4
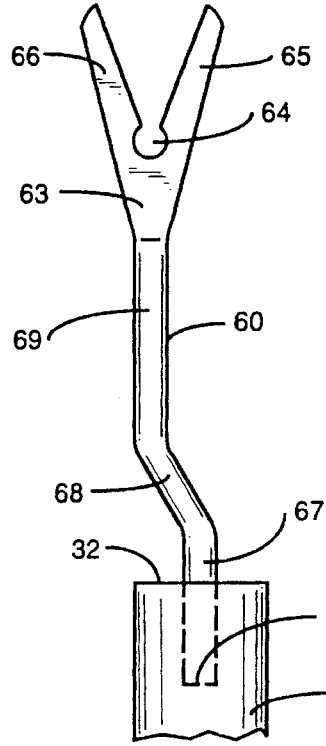
FIG. 5
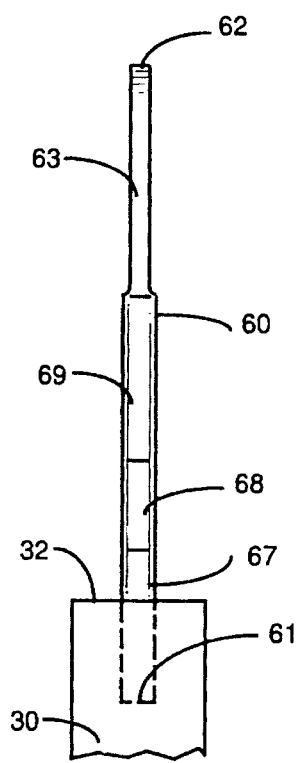
FIG. 6
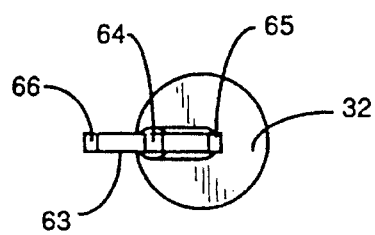
FIG. 7

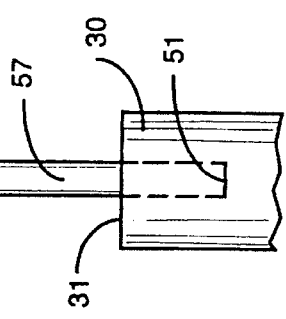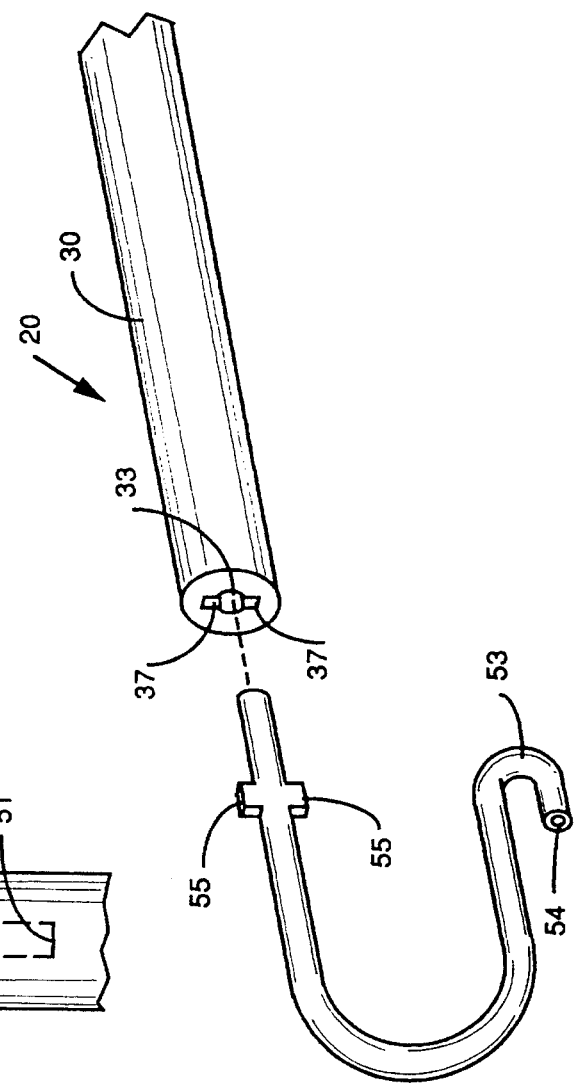

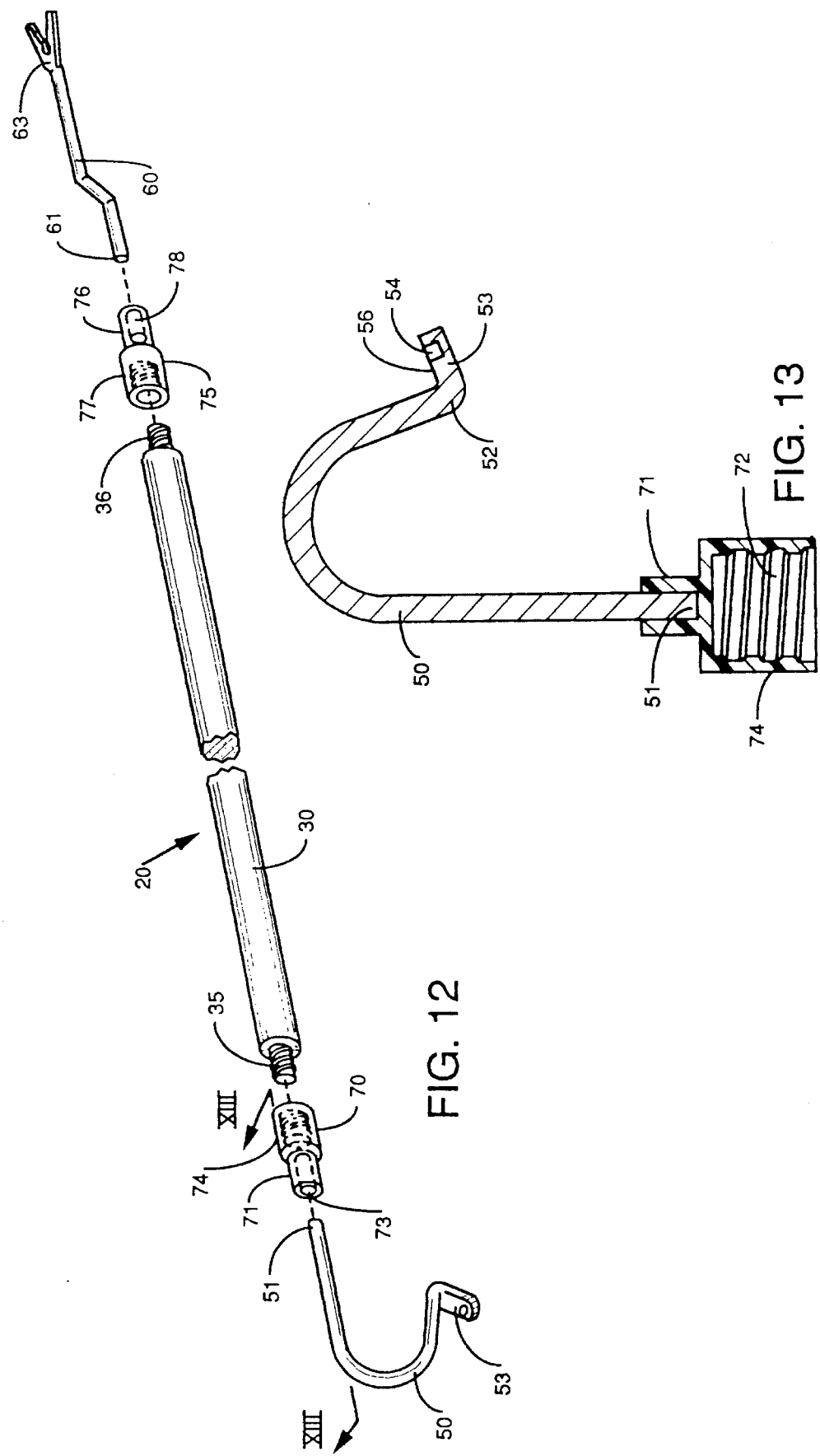

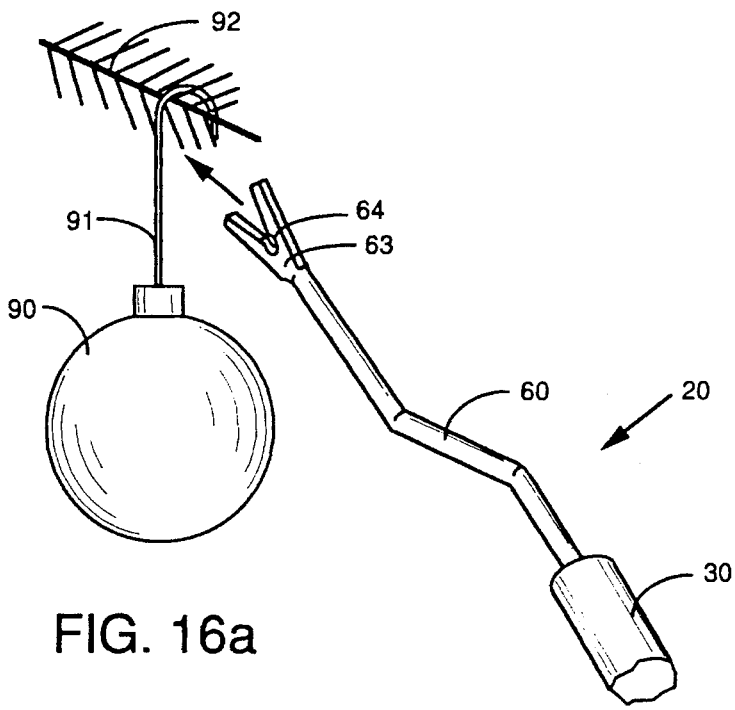
FIG. 16a
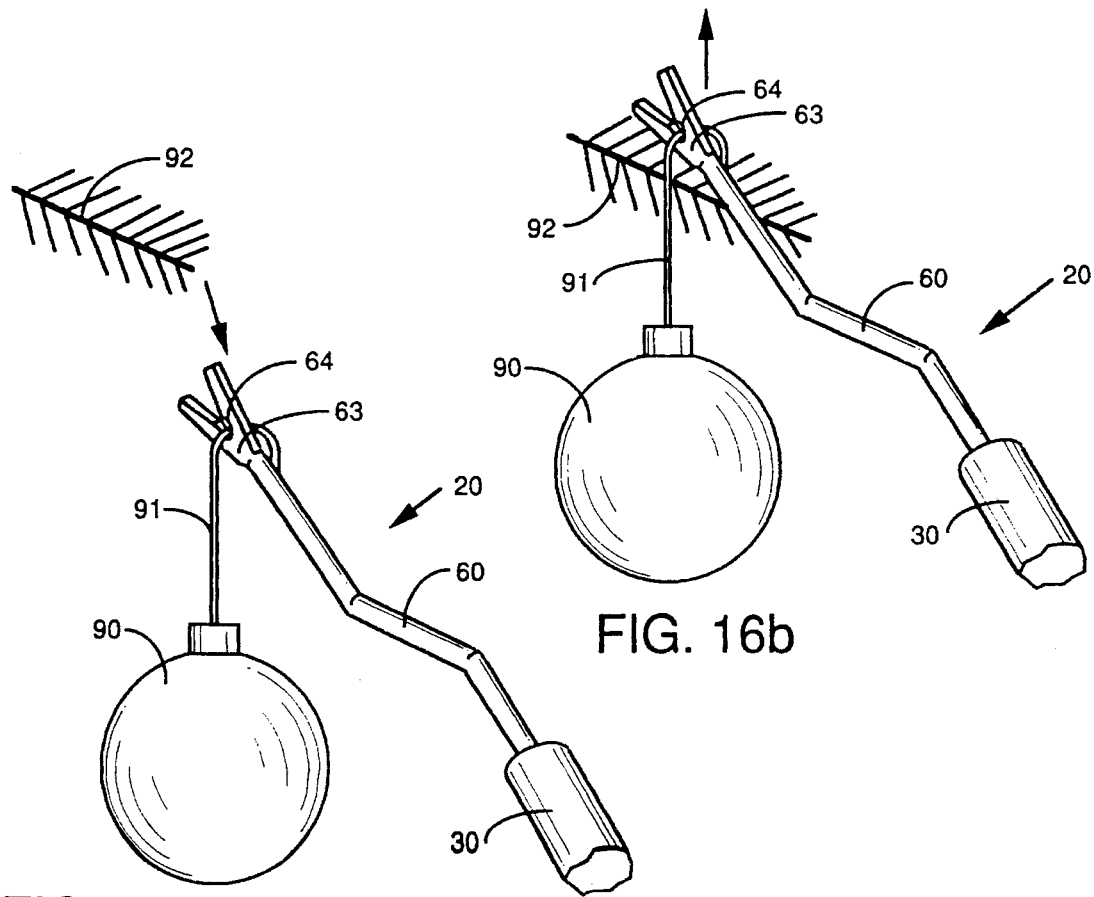
FIG. 16b
FIG. 16c

ORNAMENT HANDLING APPARATUS

BACKGROUND OF THE INVENTION

1. Field of the Invention

The present invention relates to an apparatus for hanging and retrieving ornaments, light strands and other objects.

2. Description of the Prior Art

Festive and holiday decorating has been a highly popular pastime for a considerable number of years. In particular, ornaments and lights have been hung on trees, supporting guy wires and other suspension devices to celebrate holidays, religious observances and other occasions.

Despite the substantial popularity of festive and holiday decorating, the methodologies for placing and removing such ornamentation have not been particularly successful. This is especially true where the ornamentation or other objects are positioned and removed at heights above one's shoulders. For example, stools and ladders may provide adequate assistance for handling ornamentation on short trees, but they are of little assistance if the tree is over 8 feet in height.

A variety of devices has been developed to help people perform activities at heights above their shoulders and in other awkward or hazardous positions. See, for example, the devices shown in U.S. Pat. Nos. 705,775, 734,180, 1,217,680, 1,512,315, 3,644,951, 3,819,221, 3,868,136, 3,936,088, 4,153,286, 4,395,840, 4,683,783, 4,899,050 and 5,224,745.

However, these devices would be of little assistance to a person hanging ornaments or other objects having a hook insofar as these devices mainly consist of fork-type devices which would support the ornament hook at the very place said hook is to be placed on a branch or other object support. Therefore, placing an ornament on a branch with these devices would be very difficult because the fork would come in contact with the branch, thereby disrupting neighboring ornaments and making the transfer of the ornament from the device to the branch a tedious event.

It is the object of the present invention to provide an ornament handling apparatus which assists in the hanging and removal of ornaments and other objects, especially at heights above a person's shoulders. It is a further object of the invention to assist one with the placement and removal of ornaments without disrupting previously hung ornaments. Finally, it is an additional object of the invention to provide an apparatus which is easy to use, lightweight, inexpensive and simple in construction.

SUMMARY OF THE INVENTION

Therefore, I have developed an apparatus for handling ornaments and other objects which includes an elongated handle having opposed ends and a hook-shaped applicator. The hook-shaped applicator is attached to one end of said elongated handle and extends outwardly therefrom. The applicator includes a hook receiving hole located away from the elongated handle. The hook receiving hole extends at least partially into the applicator and is configured to receive a free end of an ornament or object hook.

It is preferred that the applicator includes a J-shaped member removably attached at a long end thereof to the elongated handle. A support member is attached to a short end of the J-shaped member and the hook receiving hole extends at least partially into the support member. The applicator may alternatively include four straight portions angularly disposed to one another and the support member may either be a straight or U-shaped member.

The apparatus may further include a retriever removably attached to an end of the elongated handle. The retriever extends outwardly from the elongated handle and includes a hook engaging element having two arms joined together at a vertex and extending outwardly and away from one another. The hook engaging element additionally has a retrieval hole located at the vertex of the two arms which is configured to hold an ornament or object hook therein.

It is preferred that the hook engaging element of the retriever be formed as a flat, V-shaped member and the applicator, retriever and support member may consist of rod-shaped elements.

It is realized that the applicator may be affixed to a connector for attachment to an elongated handle. The apparatus may additionally be sold as a kit wherein both the applicator and retriever are affixed to separate connectors for attachment to the elongated handle. The connectors may be fixedly or removably attached to the elongated handle. Alternatively, the elongated handle may be telescopically extendable and have only one bore hole to interchangeably receive either the applicator or retriever therein.

Other features and advantages of the present invention will become apparent from the following detailed description in conjunction with the accompanying drawings.

BRIEF DESCRIPTION OF THE DRAWINGS

FIG. 1 is a perspective view of an ornament handling apparatus in accordance with the present invention;

FIG. 2 is an exploded view of the ornament handling apparatus shown in FIG. 1;

FIG. 3 is a section taken through the hook-shaped applicator of the ornament handling apparatus along lines III—III of FIG. 1;

FIG. 4 is a top view of the hook-shaped applicator shown in FIG. 1;

FIG. 5 is a front view of the retriever shown in FIG. 1;

FIG. 6 is a side view of the retriever shown in FIG. 5;

FIG. 7 is a top view of the retriever shown in FIG. 5;

FIG. 8 is a side view of the hook-shaped applicator of the ornament handling apparatus having four generally straight portions;

FIG. 9 is an exploded view of the ornament handling apparatus having a J-shaped applicator and a U-shaped support member;

FIG. 10 is a section taken through the support member showing a countersunk hook receiving hole;

FIG. 12 is an exploded view, similar to FIG. 11, of the ornament handling apparatus with a retriever opposite the hook-shaped applicator;

FIG. 13 is a section taken through the hook-shaped applicator and connector of the ornament handling apparatus along lines XIII—XIII of FIG. 12;

FIG. 16a is a front view of the ornament handling apparatus approaching an ornament hook;

FIG. 16b is a front view, similar to FIG. 16a, of the ornament handling apparatus engaging an ornament hook within the vertex of the retriever; and FIG. 16c is a front view, similar to FIGS. 16a and 16b, of the ornament handling apparatus removing an ornament from a tree branch.

DESCRIPTION OF THE PREFERRED EMBODIMENTS

Figure 11:
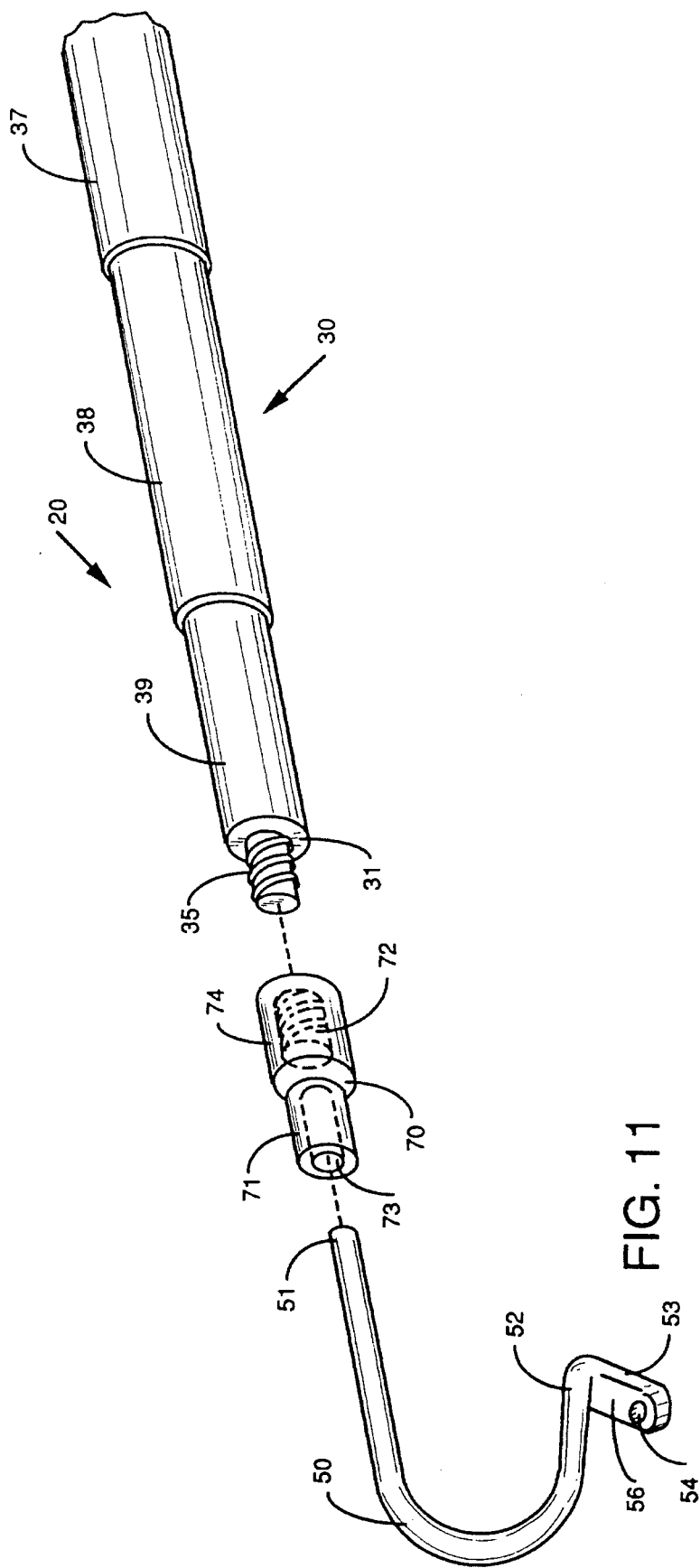
FIG. 11 is an exploded view of a further embodiment of the ornament handling apparatus showing the hook-shaped applicator, a connector and a telescopic handle.

One embodiment of an ornament handling apparatus 20 in accordance with the present invention is shown in FIGS. 1–7. The ornament handling apparatus 20 includes an elongated handle 30 having two ends 31, 32. At least one end 31, 32 of the elongated handle 30 has a respective bore hole 33, 34, extending into the elongated handle 30 as shown in FIG. 2. The elongated handle 30 may be constructed of wood, plastic, fiberglass, metal or other suitable materials and may be different lengths or preferably telescopically adjustable to different lengths.

As shown in FIGS. 1–4, the hook-shaped applicator 50 is preferably a J-shaped 3/16"–1/4" steel rod and is attached to one end 31 of the elongated handle 30. A first end 51 of the applicator 50 extends somewhat further than a second end 52 as shown in FIG. 2. This first end 51 is pressed into the bore hole 33 in the elongated handle 30, and is fixedly attached thereto by friction or an adhesive substance, such as bonding glue.

It is also appreciated that the applicator 50 may be attached to the elongated handle 30 by alternative methods known in the art, including cutting threads into the first end 51 of the applicator 50 and screwing the first end 51 into the bore hole 33 in the elongated handle 30.

A support member 53 is integrally formed with or attached to the second end 52 of the applicator 50. The support member 53 will preferably be formed as a U-shaped member as shown in FIG. 9 or a straight member as shown in FIG. 3.

Figure 15A:
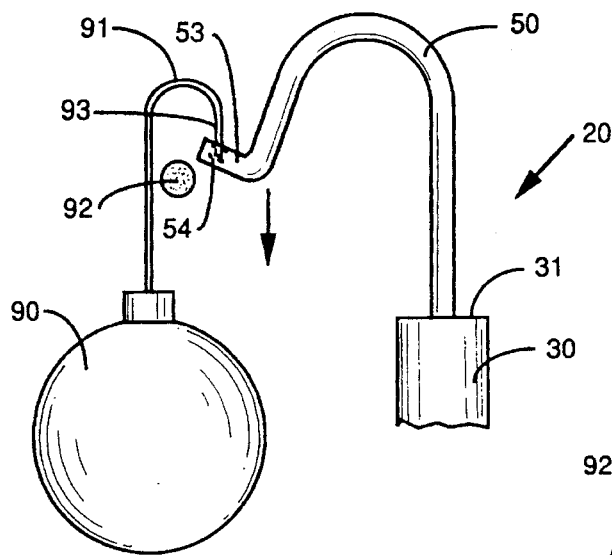
FIG. 15a is a section through a tree branch showing the ornament handling apparatus lowering an ornament hook onto the tree branch.
Figure 15B:
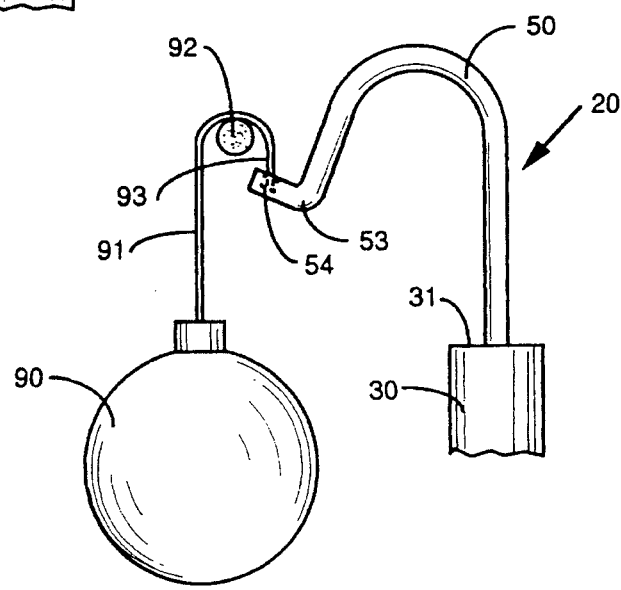
FIG. 15b is a section through a tree branch, similar to FIG. 15a, showing the ornament handling apparatus placing an ornament hook on a tree branch.
Figure 15C:
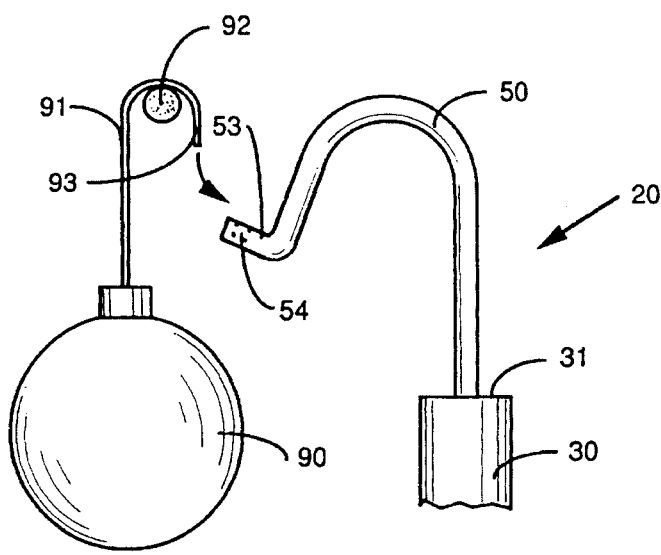
FIG. 15c is a section through a tree branch, similar to FIGS. 15a and 15b, showing the ornament handling apparatus being removed after an ornament hook has been placed on a tree branch.

The support member 53 includes a hook receiving hole 54 for holding the free end 93 of an ornament hook 91. The hook receiving hole 54 extends partially into the support member 53 from a free end of the U-shaped support member 53 as shown in FIG. 9 or an upper surface 56 thereof as shown in FIGS. 3 and 4. The hook receiving hole 54 preferably extends 3/16" into the support member 53. As shown in FIG. 10, the preferred diameter of the hook receiving hole 54 is 1/8" at the surface of the support member 53 tapering to 1/16" to fittingly hold an ornament hook 91 therein. However, the hook receiving hole 54 is also of sufficient diameter to permit an ornament hook 91 to be easily disengaged upon placement of an ornament 90 on a tree branch 92 as shown in FIGS. 15a–15c. The hook receiving hole 54 should be a sufficient distance from a longitudinal line extending through the elongated handle 30 such that an ornament 90 attached thereto by an ornament hook 91 will not come into contact with the elongated handle 30.

A U-shaped support member 53 is advantageous because ornamentation, such as light strands or garland, may be held within the U-shaped support member 53. The ornament handling apparatus 20 may thereafter be used to hang or remove light strands, garland or other ornamentation.

As shown in FIG. 8, the applicator 50 may also be comprised of four straight portions, 57, 58, 59 and a support member 53. The first straight portion 57 is fixedly attached to the elongated handle 30 in the same manner as previously disclosed and is parallel to a longitudinal line extending through the elongated handle 30. A second straight portion 58 is integrally formed with or attached to the first straight portion 57 and extends upwardly and away from the first straight portion 57 and the elongated handle 30. The first straight portion 57 and the second straight portion 58 form an angle between 90°–180°, preferably about 130°, as shown in FIG. 8. A third straight portion 59 is integrally formed with or attached to the second straight portion 58 and extends downward and away from the second straight portion 58 and toward the elongated handle 30. The second straight portion 58 and the third straight portion 59 preferably form a right angle.

The support member 53 is integrally formed with or attached to the third straight portion 59 at a right angle and is positioned away from the elongated handle 30. The support member 53 contains a hook receiving hole 54 for holding the free end 93 of the ornament hook 91. The hook receiving hole 54 extends at least partially into the support member 53 from an upper surface 56 thereof.

The ornament handling apparatus 20 may further include a retriever 60 attached to the other end 32 of the elongated handle 30 as shown in FIGS. 1 and 2. The retriever 60 is a 3/16"–1/4" steel rod which may be attached to the elongated handle 30 by inserting a first end 61 into the bore hole 34 located in the other end 32 of the elongated handle 30. The retriever 60 may be bound to the elongated handle 30 with a glue or similar adhesive compound, or by friction. Alternatively, the elongated handle 30 may only have one bore hole 33 and the applicator 50 and retriever 60 are removably attachable thereto. Furthermore, the first end 61 of the retriever 60 and the first end 51 of the applicator 50 may preferably include notches 55 integrally formed therewith to cooperate with slots 37 in bore holes 33, 34 as shown in FIG. 9 to prevent the applicator or retriever from rotating within the elongated handle 30.

As shown in FIG. 5, a first portion 67 of the retriever 60 extends outwardly from the first end 61 and is parallel to a longitudinal line extending through the elongated handle 30. A second portion 68 is integrally formed with or attached to the first portion 67 and extends upward and away from the first portion 67 and the elongated handle 30. The first portion 67 and the second portion 68 form an angle between 90°–180°, preferably 150°. A third portion 69 is integrally formed with or attached to the second portion 68 and extends outwardly from the second portion 68 and the elongated handle 30. The third portion 69 is parallel to the longitudinal line extending through the elongated handle 30. The retriever 60 terminates in a second end 62 as shown in FIG. 6.

The third portion 69 of the retriever 60 integrally forms a hook engaging element 63 which includes two arms 65, 66 joined at a vertex as shown in FIG. 5. The two arms 65, 66 extend outwardly and are spaced apart from one another to form an angle between 30°–130°, preferably about 40°. The hook engaging element 63 has a retrieval hole 64 located at the vertex of the arms 65, 66 and is an appropriate diameter, preferably 1/16", to securely hold an ornament hook 91 within the vertex.

FIGS. 11–13 show additional embodiments of the present invention. In particular, the applicator 50 is attached to a first connector 70 and the retriever 60 is attached to a second connector 75. The connectors 70, 75 are identical and both include shanks 71, 76 integrally formed with female threaded members 74, 77, respectively. The connectors 70, 75 are useable to attach the applicator 50 or retriever 60, respectively, to the elongated handle 30 as shown in FIG. 12.

In the embodiment of the invention shown in FIG. 11, a first end 51 of the applicator 50 is placed into a bore hole 73 in the shank 71 of the first connector 70 and is fixedly attached thereto with a glue or similar adhesive substance. The female threaded member 74 is placed over the male threaded member 35 of the elongated handle 30, and the first connector 70 is screwed onto the elongated handle 30 until the first connector 70 is tightly attached to the elongated handle 30. The threads 72 of the female threaded member 74 shown in FIG. 13 may be configured to be attachable to a telescopic or other elongated pole.

A further embodiment of the invention is shown in FIG. 12 where the applicator 50 and the retriever 60 may be sold together as a kit. The retriever 60 may be attached to the second connector 75 by inserting a first end 61 of the retriever 60 into a bore hole 78 in the shank 76 of the second connector 75. The retriever 60 may be fixedly attached to the second connector 75 as previously described.

This embodiment discloses an elongated handle 30 with two male threaded members 35, 36 at opposite ends thereof enabling both the applicator 50 and the retriever 60 to be affixed to the elongated handle 30 at the same time by attachment of connectors 70, 75 to the elongated handle 30.

The first connector 70 is attached to the elongated handle 30 in the same manner as previously described. The second connector 75 is attached to the elongated handle 30 by placing the female threaded member 77 over the male threaded member 36 of the elongated handle 30. The second connector 75 is screwed onto the elongated handle 30 until it is fixedly attached thereto.

It is also appreciated that the connectors 70, 75 may be attached to the elongated handle 30 by any method known in the art, including welding or soldering. Further, the connectors 70, 75 may be constructed of plastic, metal or other suitable material for attachment to the elongated handle 30.

Figure 14:
FIG. 14 is a front view of a person using the ornament handling apparatus shown in FIG. 1.

The ornament handling apparatus 20 of the present invention can be used as shown in FIGS. 14–16. A user grasps the elongated handle 30 and the applicator 50 is useable to place an ornament 90 and other objects on a tree branch 92 and other object supports, and the retriever 60 is useable to remove an ornament 90 and other objects from the tree branch 92 and other object supports. The U-shaped support member 53 shown in FIG. 9 is usable to hang and retrieve light strands, garland and similar ornamentation by inserting the wire or string into the U-shaped support member 53 and placing the wire or string on a support or branch, or catching the wire or string in the U-shaped member 53 and removing the wire or string from a support or branch.

The ornament handling apparatus 20 is useable to place ornaments on a tree as shown in FIGS. 15a, 15b, and 15c, by inserting the free end 93 of the ornament hook 91 into the hook receiving hole 54 of the support member 53. As shown in FIG. 15a, the applicator 50 is lifted toward the tree to position the ornament hook 91 above a tree branch 92. The applicator 50 is then lowered to place the ornament hook 91 on the tree branch 92 as shown in FIG. 15b. Finally, the applicator 50 is easily removed from the ornament hook 91 as shown in FIG. 15c without disturbing other ornaments already placed on the tree.

As shown in FIGS. 16a, 16b, and 16c, the retriever 60 is useable to remove ornaments already hung on a tree branch 92. In particular, the retriever 60 is oriented to position the ornament hook 91 in the middle of the hook engaging element 63 as shown in FIG. 16a. As shown in FIG. 16b, the retriever 60 is raised upward, thereby capturing the ornament hook 91 within the retrieval hole 64 and permitting the ornament 90 to be raised away from the tree branch 92 as shown in FIG. 16c.

Having described above the presently preferred embodiments of the present invention, it is to be understood that the invention may be otherwise embodied within the scope of the appended claims.

I claim:

1. An apparatus for handling objects, said apparatus comprising:

an elongated handle having opposed ends; and a hook-shaped applicator attachable at a first end thereof to an end of said elongated handle and extending outwardly therefrom, with said applicator including a hook receiving hole located near a second end of said applicator and extending at least partially into said applicator and configured to receive a free end of an object hook, with the second end of said applicator located away from a longitudinal line extending through said elongated handle such that an object attached thereto by an object hook will not contact said elongated handle during normal use, wherein said apparatus is useable to hang objects by positioning a user's hand about said elongated handle, inserting a free end of an object hook into said hook receiving hole, orientating said apparatus to position the object hook above an object support, lowering said apparatus to place the object hook onto the object support, and removing said applicator from the object hook.

2. The apparatus of claim 1, wherein the object is an ornament.

3. The apparatus of claim 1, wherein said applicator includes a J-shaped member attached at a long end thereof to said elongated handle and a support member integrally formed with a short end of the J-shaped member, with said hook receiving hole extending at least partially into the support member.

4. The apparatus of claim 3, wherein the support member is a U-shaped member.

5. The apparatus of claim 1, wherein said applicator is formed of four straight portions including a first straight portion attached at one end thereof to said elongated handle and parallel to said longitudinal line, a second straight portion integrally formed with the first straight portion and extending upwardly and away from the first straight portion and said elongated handle, a third straight portion integrally formed with the second straight portion and extending downwardly and away therefrom and toward said elongated handle, and a fourth straight portion integrally formed with the third straight portion and positioned away from said elongated handle and forming a support member, with said hook receiving hole extending at least partially into the support member.

6. The apparatus of claim 1, further including a retriever attachable at a first end thereof to an end of said elongated handle and extending outwardly therefrom, with said retriever including a second end formed as a hook engaging element having two arms joined together at a vertex and extending outwardly and away from one another and having a retrieval hole located at the vertex and configured to hold the object hook therein, wherein said apparatus is further useable to retrieve objects by positioning a user's hand about said elongated handle, orientating said apparatus to position an object hook within the vertex of the hook engaging element, raising said apparatus to catch the object hook in the retrieval hole and removing the object from the object support.

7. The apparatus of claim 6, wherein the hook engaging element is a flat, V-shaped member.

8. The apparatus of claim 6, wherein said applicator is formed of four straight portions including a first straight portion attached at one end thereof to said elongated handle and parallel to said longitudinal line, a second straight portion integrally formed with the first straight portion and extending upwardly and away from the first straight portion and said elongated handle, a third straight portion integrally formed with the second straight portion and extending downwardly and away therefrom and toward said elongated handle, and a fourth straight portion integrally formed with the third straight portion and positioned away from said elongated handle and forming a support member, with said hook receiving hole extending at least partially into the support member.

9. The apparatus of claim 6, wherein said applicator includes a J-shaped member attached at a long end thereof to said elongated handle and a support member integrally formed with a short end of the J-shaped member, with said hook receiving hole extending at least partially into the support member.

10. The apparatus of claim 9, wherein the support member is a U-shaped member and the hook engaging element is a flat, V-shaped member.

11. An attachment apparatus for handling objects, said attachment apparatus comprising:

a first connector configured to be attachable to an end of an elongated handle; and a hook-shaped applicator attached at a first end thereof to an upper surface of said first connector and extending outwardly therefrom, with said applicator including a hook receiving hole located near a second end of said applicator and extending at least partially into said applicator and configured to receive a free end of an object hook, with the second end of said applicator located away from a longitudinal line extending through said first connector such that an object attached thereto by an object hook will not contact the elongated handle during normal use, wherein said attachment apparatus is useable to hang objects by attaching said first connector to an end of an elongated handle, positioning a user's hand about the elongated handle, inserting a free end of an object hook into said hook receiving hole, orientating said applicator to position the object hook above an object support, lowering said applicator to place the object hook onto the object support, and removing said applicator from the object hook.

12. The attachment apparatus of claim 11, wherein the object is an ornament.

13. The attachment apparatus of claim 11, wherein said applicator includes a J-shaped member attached at a long end thereof to said first connector and a support member integrally formed with a short end of the J-shaped member, with said hook receiving hole extending at least partially into the support member.

14. The attachment apparatus of claim 13, wherein the support member is a U-shaped member.

15. The attachment apparatus of claim 11, wherein said applicator is formed of four straight portions including a first straight portion attached at one end thereof to said first connector and parallel to said longitudinal line, a second straight portion integrally formed with the first straight portion and extending upwardly and away from the first straight portion and said first connector, a third straight portion integrally formed with the second straight portion and extending downwardly and away therefrom and toward said first connector, and a fourth straight portion integrally formed with the third straight portion and positioned away from said first connector and forming a support member, with said hook receiving hole extending at least partially into the support member.

16. A kit for handling objects, said kit comprising:

a first connector configured to be attachable to an end of an elongated handle;

a hook-shaped applicator attached at a first end thereof to an upper surface of said first connector and extending outwardly therefrom, with said applicator including a hook receiving hole located near a second end of said applicator and extending at least partially into said applicator and configured to receive a free end of an object hook, with the second end of said applicator located away from a longitudinal line extending through said first connector such that an object attached thereto by an object hook will not contact the elongated handle during normal use;

a second connector configured to be attachable to an end of an elongated handle; and a retriever attached at a first end thereof to an upper surface of said second connector and extending outwardly therefrom, with said retriever including a second end formed as a hook engaging element having two arms joined together at a vertex and extending outwardly and away from one another and having a retrieval hole located at the vertex and configured to hold an object hook therein, wherein said kit is useable to hang objects by attaching said first connector to an end of an elongated handle, positioning a user's hand about the elongated handle, inserting a free end of an object hook into said hook receiving hole, orientating said applicator to position the object hook above an object support, lowering said applicator to place the object hook onto the object support, and removing said applicator from the object hook, and wherein said kit is further useable to retrieve objects by attaching said second connector to an end of the elongated handle, positioning a user's hand about the elongated handle, orientating said retriever to position an object hook within the vertex of the hook engaging element, raising said retriever to catch the object hook in the retrieval hole and removing the object from the object support.

17. The kit of claim 16, wherein the hook engaging element is a flat, V-shaped member.

18. The kit of claim 16, wherein said applicator includes a J-shaped member attached at a long end thereof to said first connector and a support member integrally formed with a short end of the J-shaped member, with said hook receiving hole extending at least partially into the support member.

19. The kit of claim 18, wherein the support member is a U-shaped member and the hook engaging element is a flat, V-shaped member.

20. An apparatus for handling objects, said apparatus comprising:

an elongated handle having opposed ends;

a hook-shaped applicator attached at a first end thereof to one end of said elongated handle and extending outwardly therefrom, with said applicator including a hook receiving hole located near a second end of said applicator and extending at least partially into said applicator and configured to receive a free end of an object hook; and a retriever attached at a first end thereof to the other end of said elongated handle and extending outwardly therefrom, with said retriever including a second end formed as a hook engaging element configured to hold an object hook therein, wherein said apparatus is useable to hang objects by positioning a user's hand about said elongated handle, inserting a free end of an object hook into said hook receiving hole, orientating said apparatus to position the object hook above an object support, lowering said apparatus to place the object hook onto the object support, and removing said applicator from the object hook, and wherein said apparatus is further useable to retrieve objects by positioning a user's hand about said elongated handle, orientating said apparatus to position an object hook within the hook engaging element, raising said apparatus to catch the object hook in the hook engaging element and removing the object from the object support.

* * * * *